US008328439B2

(12) United States Patent
Chapman et al.

(10) Patent No.: US 8,328,439 B2
(45) Date of Patent: Dec. 11, 2012

(54) ELECTRONIC DAMPENING FOR A CAMERA CRANE

(75) Inventors: Leonard T. Chapman, North Hollywood, CA (US); Stanislov Gorbatov, Los Angeles, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 304 days.

(21) Appl. No.: 12/706,805

(22) Filed: Feb. 17, 2010

(65) Prior Publication Data

US 2011/0200320 A1    Aug. 18, 2011

(51) Int. Cl.
    *G03B 17/56* (2006.01)
(52) U.S. Cl. .......................... 396/428; 318/87
(58) Field of Classification Search .................. 396/428; 318/87–88
    See application file for complete search history.

(56) References Cited

U.S. PATENT DOCUMENTS

| | | | |
|---|---|---|---|
| 1,317,266 A * | 9/1919 | Candee et al. ................. | 318/63 |
| 2,156,862 A | 5/1939 | Maugard | |
| 2,472,944 A | 6/1949 | Furer et al. | |
| 2,523,142 A * | 9/1950 | Riley .............................. | 318/63 |
| 3,434,025 A | 3/1969 | Parkinson et al. | |
| 3,588,661 A | 6/1971 | Newell | |
| 4,008,426 A | 2/1977 | Ogura | |
| 4,657,220 A | 4/1987 | Lindsay | |
| 4,907,768 A | 3/1990 | Masseron et al. | |
| 4,943,019 A | 7/1990 | Mester | |
| 4,952,953 A | 8/1990 | Ridderstolpe et al. | |
| 5,047,703 A | 9/1991 | Akamatsu | |
| 5,697,757 A | 12/1997 | Lindsay | |
| 5,729,100 A | 3/1998 | Rothstein et al. | |
| 5,768,648 A | 6/1998 | Skipp et al. | |
| 5,781,814 A | 7/1998 | Chapman | |
| 5,856,862 A | 1/1999 | Kokush | |
| 6,094,024 A * | 7/2000 | Westlake ...................... | 318/375 |

(Continued)

FOREIGN PATENT DOCUMENTS

DE          3628782 A1     3/1998

(Continued)

OTHER PUBLICATIONS

United States Patent and Trademark Office, International Search Report and Written Opinion for PCT/US2010/044792, mailed Sep. 23, 2010.

(Continued)

*Primary Examiner* — Clayton E Laballe
*Assistant Examiner* — Leon W Rhodes, Jr.
(74) *Attorney, Agent, or Firm* — Kenneth H. Ohriner; Perkins Coie LLP (57) ABSTRACT

A camera platform may be stabilized by reducing or avoiding oscillating movement, when active stabilization systems are not used. A passive dampener resists the back driving of the motors used in the active stabilization system. This dampening or resistance to back driving the motors in turn dampens movement of the camera platform. Oscillations are reduced or avoided and the camera platform may return more quickly and smoothly to a level position. The dampener may be provided as an add-on or temporarily electrically switched in accessory. The dampener may include a circuit that connects the first and second motors of the active stabilization system in series, and connects the series output of the two motors to a variable resistor through a rectifier. A transistor may be with the variable resistor to provide for more linear adjusting and a more compact variable resistor.

9 Claims, 10 Drawing Sheets

U.S. PATENT DOCUMENTS

| | | |
|---|---|---|
| 6,450,706 B1 | 9/2002 | Chapman |
| 6,478,427 B1 | 11/2002 | Morris et al. |
| 6,752,541 B1 | 6/2004 | Dykyj |
| 6,776,488 B2 | 8/2004 | Burbulla |
| 7,121,745 B2 * | 10/2006 | Chapman ............ 396/428 |
| 7,128,479 B2 * | 10/2006 | Chapman ............ 396/428 |
| 2002/0158593 A1 * | 10/2002 | Henderson et al. ........ 318/375 |
| 2007/0230947 A1 | 10/2007 | Chapman |
| 2008/0002967 A1 * | 1/2008 | Chapman ............ 396/428 |

FOREIGN PATENT DOCUMENTS

JP  08-068493  12/1996

OTHER PUBLICATIONS

Technovision USA, Inc., Techno Crane Brochure, Sep. 1986.
Orion Technocrane, Super Techno Crane Brochure, Sep. 1986.

* cited by examiner

ELECTRONIC DAMPENING FOR A CAMERA CRANE

BACKGROUND

Camera cranes are often used in motion picture and television production. The motion picture or television camera is typically mounted on a crane arm supported on a mobile base, dolly, or truck. The mobile base may be pushed and steered by hand. Larger units, which have more weight carrying capacity, and longer reaches, typically have electric driving motors powered by onboard batteries. Some mobile bases also including conventional gasoline or diesel engines, may also serve as over the road vehicles.

Camera cranes generally have a crane arm supported on a base, with a camera platform at one end of the arm, and a counter weight at the other end. The crane arm can be pivoted by hand to raise and lower the camera, and also to pan to the left or right side. The crane may have telescoping arm sections to provide an extended reach and more versatile camera movement in use, and a relatively compact size during transport and storage. A leveling system is often included to maintain the camera platform in a level orientation, as the elevation angle of the arm changes. Some camera cranes use a mechanical leveling system that includes cables attached to the camera platform. The cables generally keep the camera platform in a level position, regardless of the elevation angle of the crane arm. These types of camera cranes may also include camera platform stabilization systems that actively and instantaneously act to correct out of level conditions, using position sensors and electric motors. See for example, U.S. Patent Application 2008/0002967 and U.S. Pat. Nos. 7,128,479 and 7,121,745, each incorporated herein by reference. The camera platform stabilization system may or may not be used, depending on various factors, such as the filming environment, the type of camera shot desired, the type of motion base that the crane is mounted on, and the speed and quality of the motion base movement. When the camera platform stabilization system is not used, the position of the camera platform is not actively controlled, except via the cables of the mechanical platform leveling system, which involves certain disadvantages.

SUMMARY

Using a new concept, the camera platform may be stabilized by reducing or avoiding oscillating movement, when active stabilization systems are not used. In one aspect, a passive dampener resists the back driving of the motors used in an active stabilization system. This dampening or resistance to back driving the motors in turn dampens movement of the camera platform. Oscillations are reduced or avoided and the camera platform may return more quickly and smoothly to a level position.

In another aspect, with a camera having first and second electric motors for stabilizing a camera platform, the dampener may be provided as an accessory. The accessory may be installed, or switched in, and used when desired. The accessory may include a circuit that connects the first and second motors in series, and connects the series output of the two motors to a variable resistor through a rectifier.

In a different aspect of the invention, a method for reducing oscillating movement of a camera platform on a camera crane may include the steps of disconnecting the motor drive unit from its electrical power source or motor controller. The motor drive unit is then connected to an electronic dampener. The electronic dampener may link the motors in series. The series current voltage output of the motors is connected to a resistor, electrically dampening oscillating movement of the camera platform.

Other aspects and advantages will be apparent from the following detailed description and drawings. The invention relies as well in sub-combinations and subsystems of the elements described. For example, each of the features listed above can be used as an improvement in a conventional crane design. Alternatively, they may be used in various combinations with each other.

BRIEF DESCRIPTION OF THE DRAWINGS

In the drawings, the same reference number indicates the same element, in each of the views.

DETAILED DESCRIPTION OF THE DRAWINGS

Figure 1:
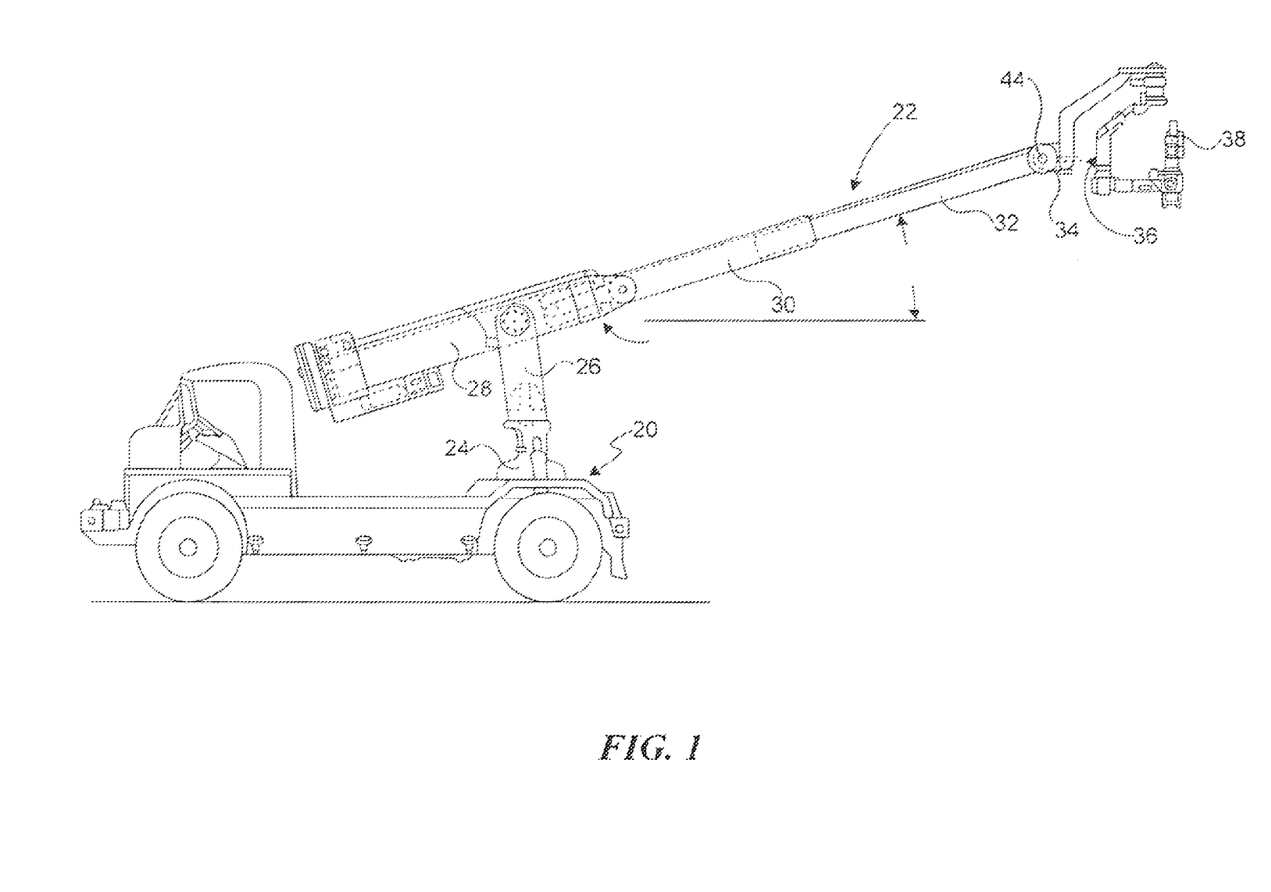
FIG. 1 is a side view of a prior art camera crane in an extended position.
Figure 2:
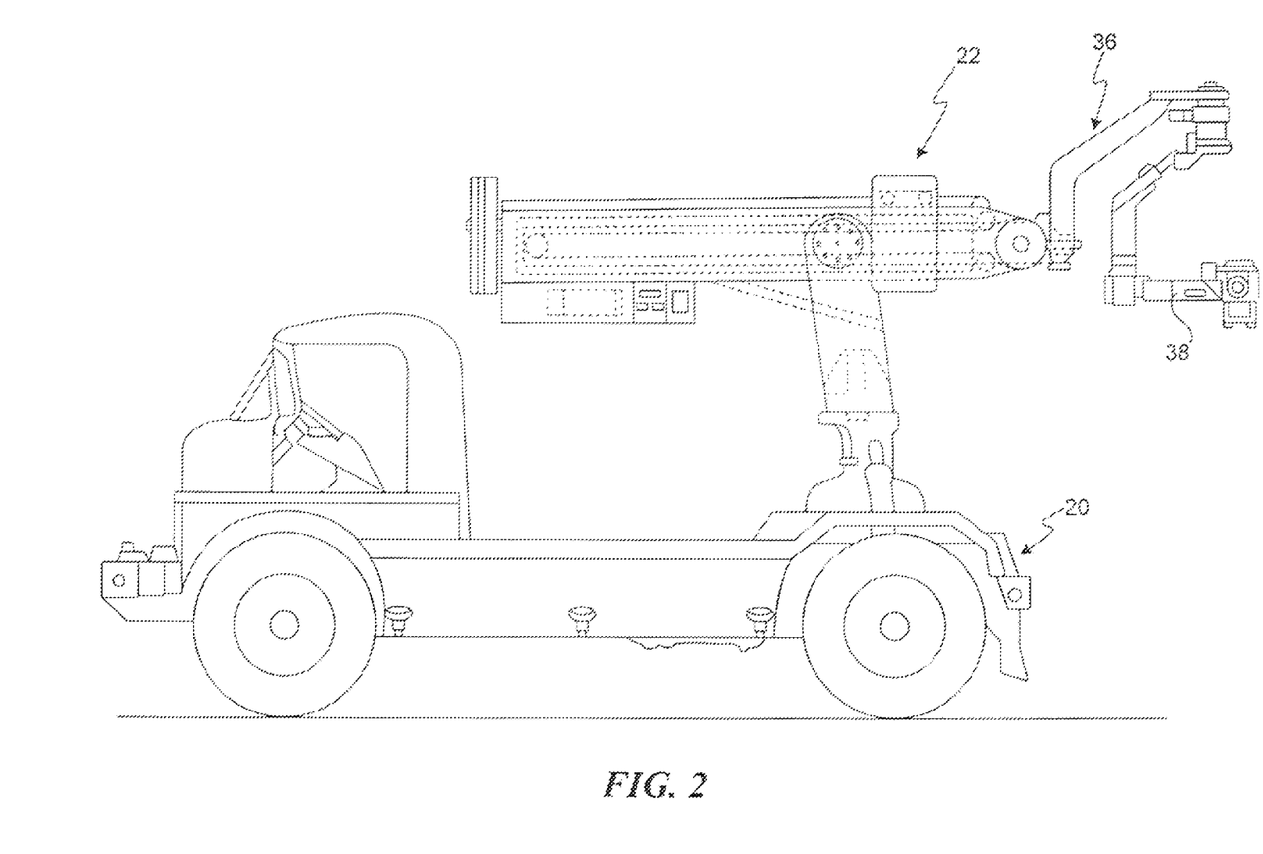
FIG. 2 is a side view of the camera crane of FIG. 1 now shown in a fully retracted position.

Turning now in detail to the drawings, as shown in FIGS. 1 and 2, a telescoping crane 22 is mounted onto a mobile base 24. The mobile base 24 may be a truck or road vehicle or a motorized special purpose camera crane base or dolly. Typically, the mobile base 24 will have wheels which drive and steer the mobile base. Four-wheel drive and four-wheel steering may be provided. For smaller scale cranes, e.g., up to about 15 feet, the mobile base 24 may be un-motorized, and may be moved or pushed by hand. For larger versions of the telescoping crane, or when required due to ground conditions or other use requirements, the mobile base can have electric motors, or internal combustion engines, for driving the wheels.

As shown in FIGS. 1 and 2, the crane 22 may be pivotally mounted on an axle on a U-shaped center post 26 which is rotatably mounted on the column 24 supported on the mobile base 20. The crane arm can therefore pivot in elevation and rotate in azimuth or panning direction. The column 24 may be automatically leveled, as described in U.S. Pat. No. 4,747,424, incorporated herein by reference, to maintain the crane 22 in a level orientation as the mobile base 24 moves over uneven ground.

Figure 4:
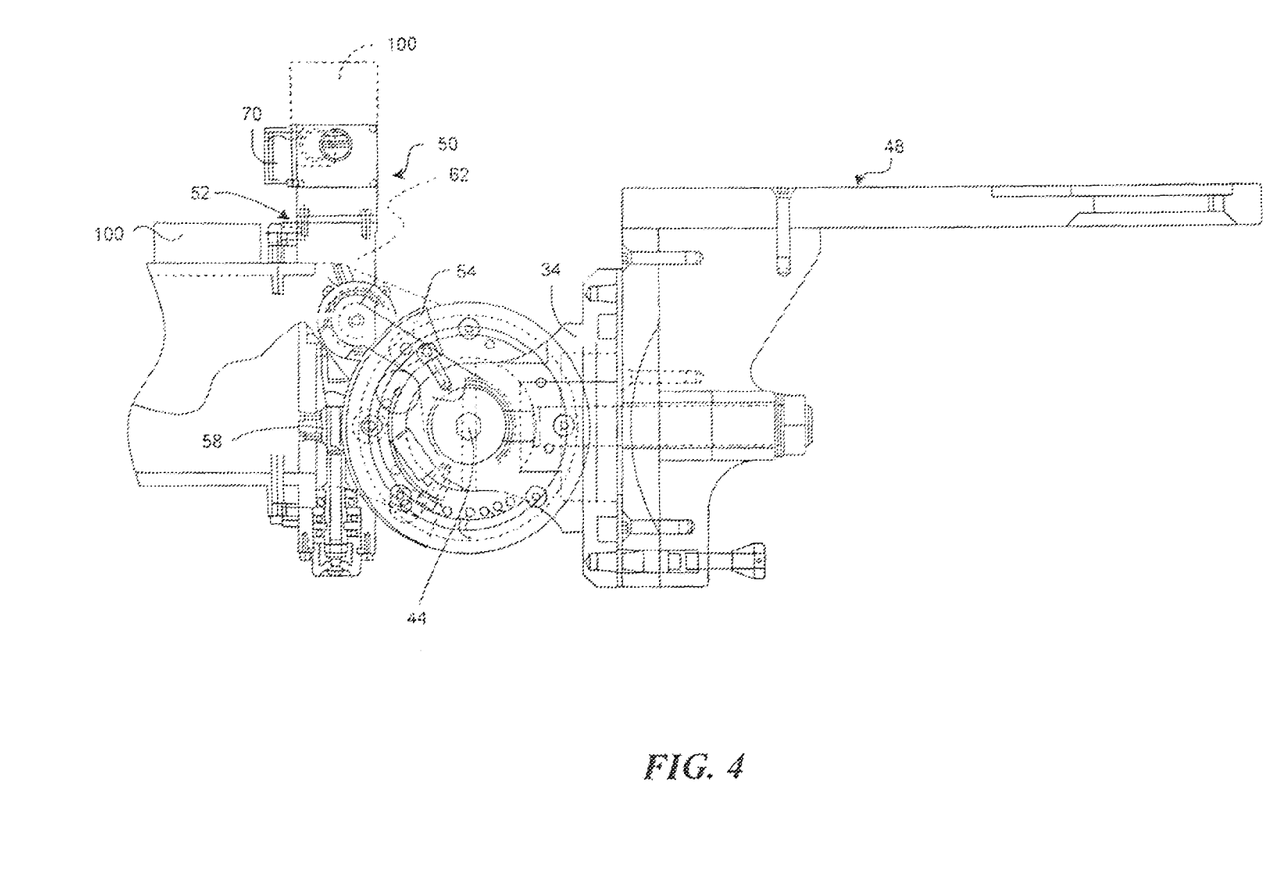
FIG. 4 is a side view of the camera crane shown in FIGS. 1 and 2 and further including an electronic dampener accessory.

As shown in FIG. 1, the crane 22 may be a telescoping crane having one or more telescoping sections, such as a first fixed section 28, and second and third telescoping sections 30 and 32. As described in US Patent Application No. 2008/0002967, a nose plate 34 is pivotally attached to the front end of the crane arm via a nose axle 44. As shown in FIGS. 1 and 2, a camera head 36, or as shown in FIG. 4, a camera platform 48 can be attached to the nose plate 34. A camera 38 is attached to the head or platform. A camera platform leveling system 40 includes cables 42 attached to a pulley on a nose axle 44.

Figure 5:
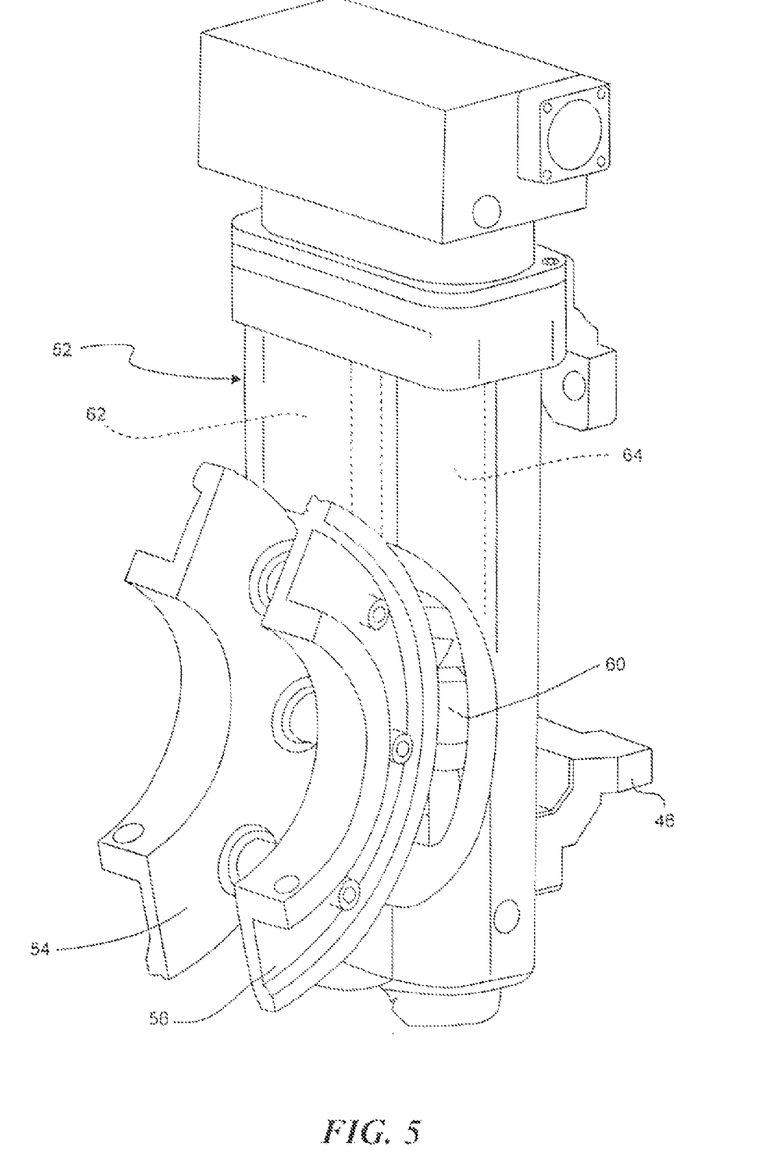
FIG. 5 is a front and side perspective view of the motor drive assembly shown in FIG. 4, and also showing the camera platform gear segments shown in FIG. 4.
Figure 6:
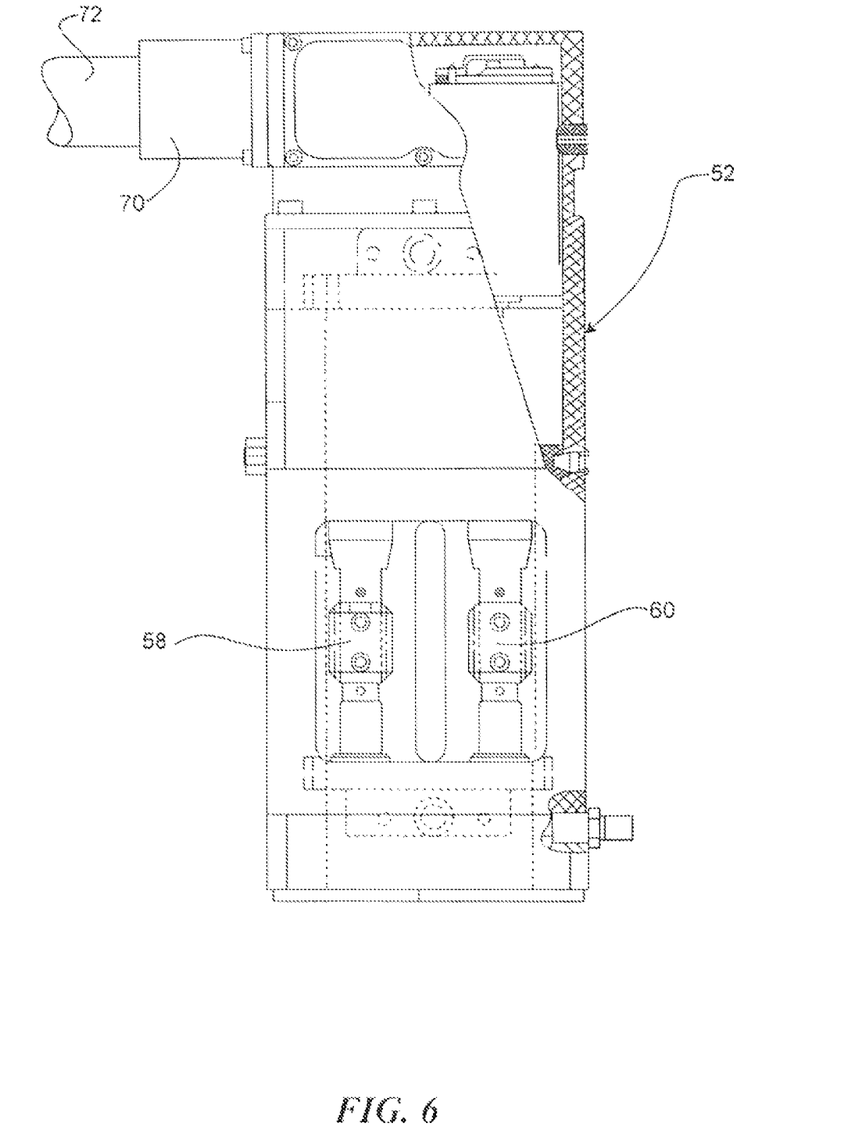
FIG. 6 is a front view of the motor drive assembly shown in FIG. 5.

Turning to FIGS. 5 and 6, as described in US Patent Application No. 2008/0002967, a platform drive system 50 includes a gear motor assembly 52 including first and second dc motors 62 and 64 driving first and second gears 58 and 60 engaged respectively to first and second gear segments 54 and 56 on the nose plate 34. With input from position sensors on the camera platform, the drive system 50 can actively operate to keep the camera platform level and steady, despite varying loading conditions.

When the platform drive system is not used, however, only the cables 42 of the mechanical leveling system act to keep the camera platform level. The cables 42 act in one direction, i.e., pulling the camera platform up (counter clockwise in FIGS. 1 and 2). In addition, high dynamic loads on the camera platform can cause slight amounts of elastic strain on the cables. In other words, in use, the cables can alternately stretch and retract by small amounts. This causes the cables to act like a spring under certain loading conditions. The camera platform movement has little inherent dampening. Consequently, the elastic strain in the cables can result in oscillating movement of the camera platform. That is the elastic strain in the cables can cause the camera platform to overshoot from under level to over level. The camera platform then pivots back down (via gravity) past level, until the cables once again exert a counteracting force. This oscillation movement may continue for several cycles, causing noticeable and undesirable movement of the camera platform. This movement may be especially objectionable with high definition and three-dimensional cameras.

Figure 7:
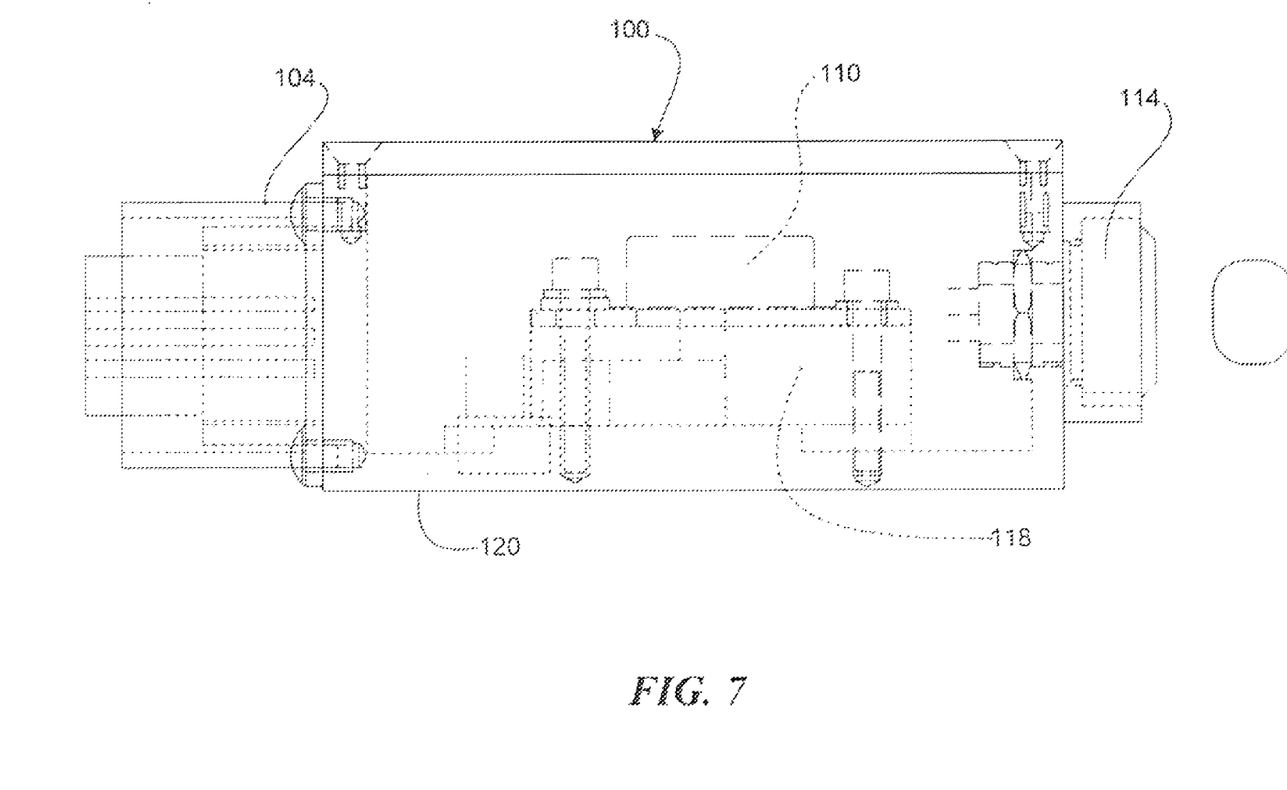
FIG. 7 is a side view of the dampener shown in FIG. 4.
Figure 8:
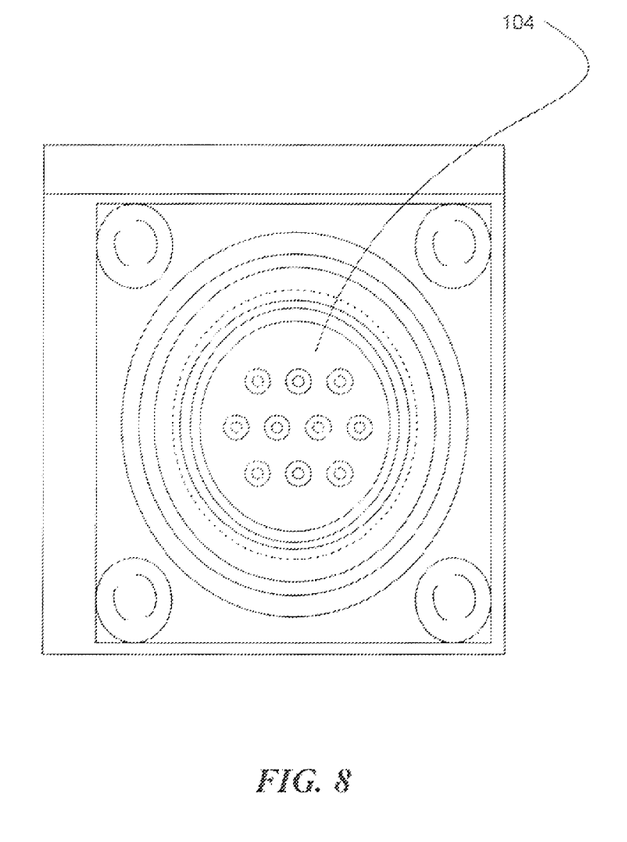
FIG. 8 is a top view of the dampener shown in FIG. 7.
Figure 9:
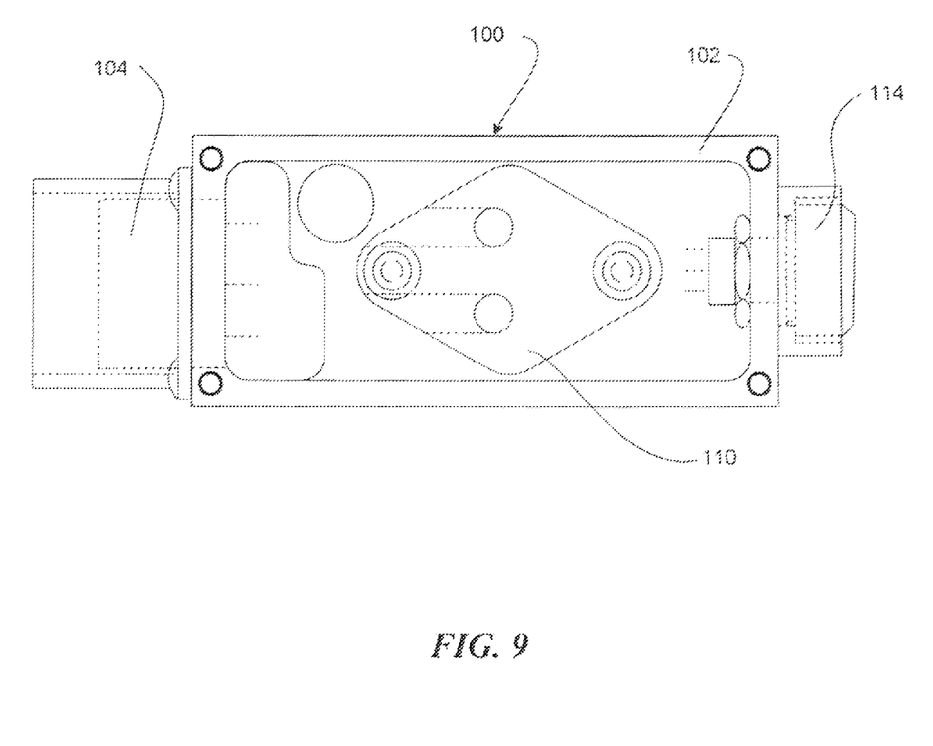
FIG. 9 is a side view of the dampener shown in FIG. 7.

To reduce oscillation under these conditions, an electronic dampener 100 as shown in FIGS. 7-10 may be used. The dampener 100 has a dampening circuit 108 within a housing 102. The circuit includes a rectifier 112 linked to a variable resistor 114, a fixed resistor 116 and a transistor 110 (FET). As shown in FIGS. 7 and 9, the variable resistor is adjustable via a knob on the outside of the housing 102. The transistor 110 is mounted on a heat sink 118 in the housing 102. The bottom surface 120 of the housing 102 may also be adapted to conduct heat from the housing to a supporting surface. The rectifier may be a four diode bridge, such as a W01M-BP and the transistor may be a 2N3773. The variable resistor 114 may be adjustable from 1 to 10,000 ohms, while the fixed resistor 116 may be 150 ohms. The transistor helps to make dampening adjustments linear with turning movement of the knob of the variable resistor. The transistor also helps to reduce the size of the variable resistor.

When the platform drive system is in use, the gear motor assembly is connected via a connector 70 and a power/control cable 72 to motor controllers which separately connect to and independently control the first and second motors 60 and 62. This allows the motors to stabilize the camera platform, while optionally also operating with zero backlash, as described in Patent Application No. 2008/0002967.

Figure 10:
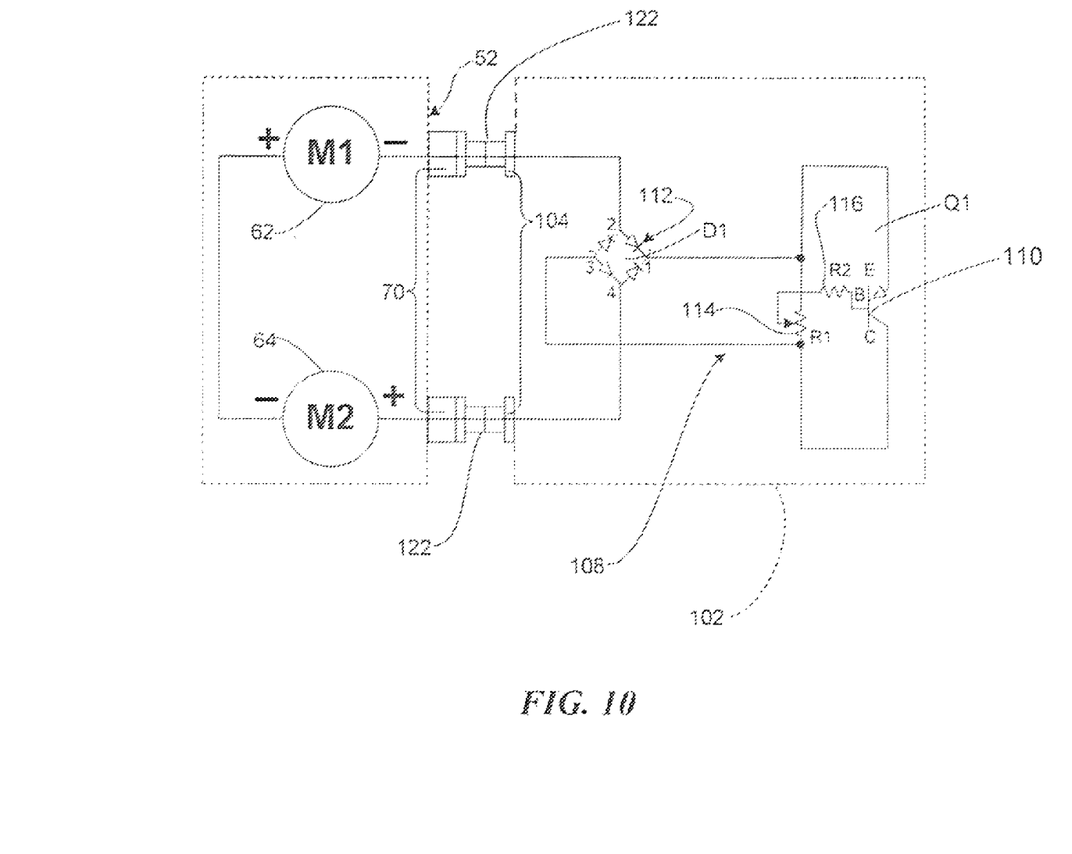
FIG. 10 is a schematic diagram of the dampener and motor drive assembly shown in FIG. 4.

Referring to FIG. 10, to use the dampener 100, the connector 70 on the gear motor assembly 52 is removed. The dampener 100 is then electrically connected to the gear motor assembly 52 via a jumper cable 122 which mates with the connector 104 on the dampener 100, at one end, and to the connector 70 on gear motor assembly 52, at the other end. The jumper cable 122 also connects the first and second motors 62 and 64 in series, as shown in FIG. 10. The output of the series connected motors is connected to opposite sides of the rectifier, i.e. to terminals 2 and 4 of the bridge 112. The base of the transistor remains positively biased regardless of the direction of movement. The connector 104 on the dampener may be adapted to mate directly with the connector 70 on the gear motor assembly 52, for example, as a plug in accessory. In this case, no jumper cable 122 is used.

The other pair of opposite terminals 1 and 3 are connected to opposite ends of the variable resistor 114. The emitter and collector of the transistor 116 are also connected to the opposite sides of the variable resistor 114. The base of the transistor 116 is connected to the intermediate variable position terminal of the variable resistor 114. The dampener 100 may be mounted on the nose plate, the camera platform, the arm, or any other convenient location. The variable resistor 114 may be adjusted by turning the knob on the housing 102, or it may be adjusted remotely.

Pivoting movement of the camera platform (about the nose axle 44) back drives the motors 62 and 64 in the same direction, via the gear sectors 54 and 56. The motors act as generators in series, with their voltages added. Referring to FIG. 10, regardless of the direction of camera platform movement and the resulting polarity of the motors, the rectifier 112 provides forward current to the variable resistor 114. Current flows from the collector to the emitter of the transistor 116, in proportion to the voltage applied to the base of the transistor. The voltage applied to the base varies with the setting of the variable resistor 114, and the current passing through R1 in FIG. 10. When the variable resistor is set to high resistance, e.g., 10,000 ohms, the dampener 100 provides a high level of mechanical dampening or resistance to movement. When the variable resistor is set to low or no resistance, the dampener provides little or no dampening. The dampener 100 places an electrical load on the back driven motors 62 and 64. This increases the drag on the motors. Consequently, movement of the camera platform is dampened. To select a preferred amount of dampening, the user can manually displace the camera platform from level, and then release the platform while observing the camera platform movement. If the camera platform returns to level too slowly (an over damped condition), dampening can be decreased by increasing the resistance of the variable resistor 114. If the camera platform significantly overshoots through the level position, (under damped condition), dampening can similarly be increased.

Figure 3:
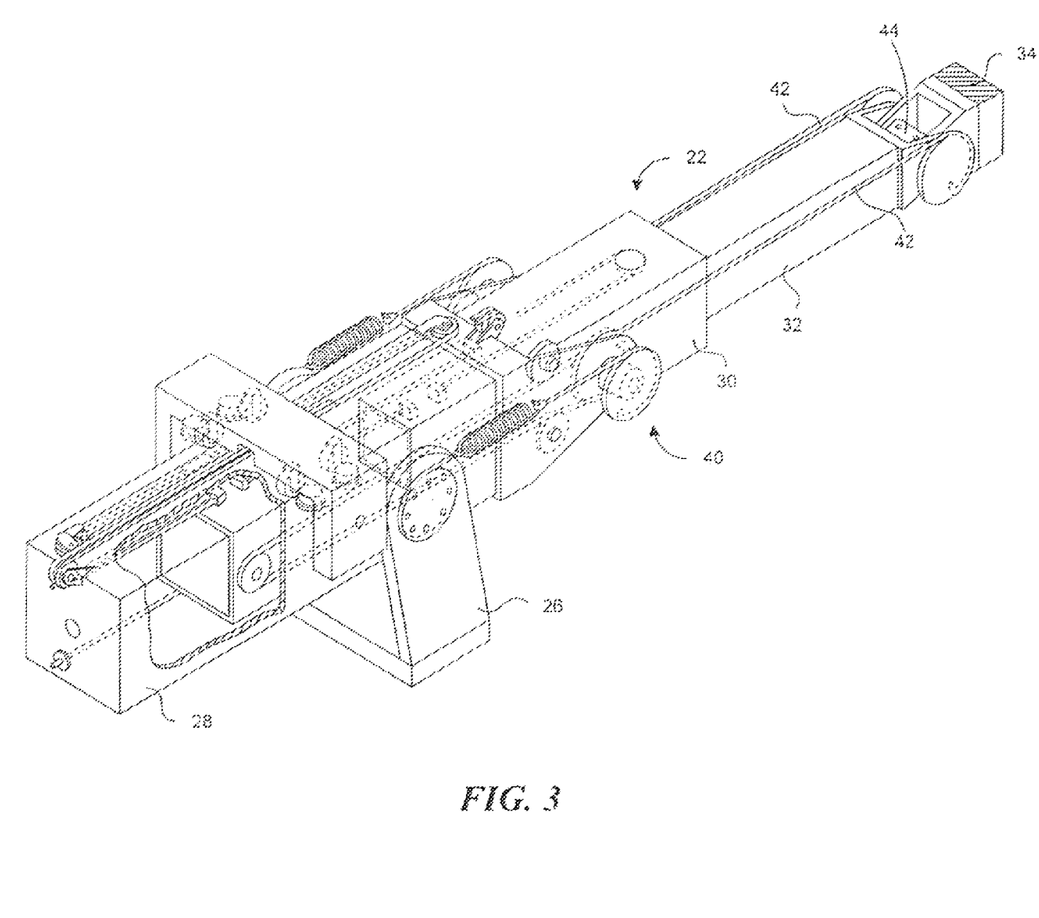
FIG. 3 is a schematically illustrated perspective view of the camera crane shown in FIGS. 1 and 2.

Referring to FIGS. 3, 4 and 10, with the stabilization system described in Patent Application No. 2008/0002967 not used, downward angulations or pivoting movement about the nose axle 44 (in the elevation angle) is resisted by the cables 42. With the dampener 100 installed, pivoting movement about the nose axle 44, in either direction, is resisted or dampened. The dampening combined with the elastic spring characteristics of the cables reduces oscillating movement of the camera platform. During the upward movement, the dampening force acts in the downward direction, reducing the overshoot past level. During the downward direction, the dampening force acts in the upward direction, reducing tension in the cables, and any tendency towards bounce movements.

The dampener 100 may be used when the crane is being transported, on the mobile base 20 or otherwise, to reduce movement of the camera platform. The dampener may also be desirable when the crane is used on a camera car. Often, while mounting a camera or other payload onto the camera platform, the electrical platform drive system 50 is off. With many or most cranes, this allows the camera platform to move relatively freely, making camera mounting difficult. In some cases, camera mounting has typically required two people, one to hold the camera platform steady and the other to mount the camera. Use of the dampener prevents the camera platform from moving freely, which can simplify mounting a camera on the platform, even by a single person. The dampener 100 may also be used in place of other damped shock/vibration isolator accessories often used on camera cranes. While the drawings show the dampener 100 used on crane have a mechanical cable leveling system, the dampener may also be used on any other type of camera crane using one or more electric motors to position or level the camera platform. Regardless of the type of crane, the dampener may be hard wired into the motor(s) and switched in and out as desired, or it may be provided as a separate accessory connectable directly to the motor or motor assembly, with or without a jumper cable. In addition, regardless of the type of camera crane, the dampener may allow for continued use of the crane during an electrical failure of the platform drive system.

Thus, a novel dampener for use with a camera crane has been shown and described. Changes and substitution may of course he made without departure from the spirit and scope of the invention. For example, the dampener 100 may simply provide a fixed or variable resistance, without using the transistor. It is also not necessary to connect the motors in series, since the output of each back driven motor may be separately damped in separate circuits. The dampener may also be used with a crane having an active stabilizing system using a single motor, or more than two motors. The invention, therefore, should not be limited, except to the following claims and their equivalents.

The invention claimed is:

1. A camera crane comprising:
a crane arm;
a camera platform pivotally attached to first end of the crane arm;
at least one camera platform leveling cable attached to the camera platform and to the crane arm, with the cable acting to maintain the camera platform substantially level as the elevation angle of the camera arm changes;
a motor drive unit attached to the crane arm, with the motor drive unit including a first drive motor having a first shaft and a first gear attached to the first shaft, and including a second drive motor having a second shaft and a second gear attached to the second shaft, and with the polarity of the first motor opposite to the polarity of the second motor;
first and second platform gear segments attached to the camera platform, with the first gear meshing with the first platform gear segment and with the second gear meshing with the second platform gear segment; and
an electronic dampening circuit electrically connected to the first and the second drive motors, with the dampening circuit placing the first and second drive motors electrically in series, and with the output of the series connected drive motors connecting to a rectifier, a variable resistor, and a transistor.

2. The camera crane of claim 1 further with the transistor having an emitter connected to the first side of the variable resistor, a collector connected to the second side of the variable resistor, and with a base connected to an intermediate terminal of the variable resistor through a fixed resistor.

3. A method for reducing oscillating movement of a camera platform on a camera crane having a platform stabilizing system including a motor drive unit having first and second motors connected to an electrical power source, comprising:
disconnecting the motor drive unit from the electrical power source;
connecting the first and second motors to an electronic dampener;
electrically dampening oscillating movement of the camera platform; and
connecting the first and second motors in series and rectifying the outputs of the first and second series connected motors.

4. The method of claim 3 further comprising adjusting the dampening by varying electrical resistance of the electronic dampener.

5. The method of claim 4 further comprising connecting a transistor to the variable resistor and controlling current through the transistor in proportion to current through the variable resistor and the resistance setting of the variable resistor.

6. The method of claim 3 with the variable resistor having three terminals and further comprising connecting a transistor to each of the three terminals of the variable resistor.

7. A method for reducing oscillating movement of a camera platform on a camera crane having camera platform stabilizing system including a motor drive unit having first and second motors connected to an electrical power source, comprising:
disconnecting the motor drive unit from the electrical power source;
connecting the first and second motors to an electronic dampener;
electrically dampening oscillating movement of the camera platform;
adjusting the dampening by selecting a resistance setting of a variable resistor;
connecting a transistor to the variable resistor and controlling current through the transistor in proportion to current through the variable resistor and the resistance setting of the variable resistor.

8. The method of claim 7 further comprising connecting the first and second motors in series and rectifying the outputs of the first and second series connected motors.

9. The method of claim 7 with the variable resistor having three terminals and further comprising a transistor connected to each of the three terminals of the variable resistor.

* * * * *